Nov. 18, 1941.  N. B. NEWTON  2,263,047
POWER TRANSMISSION SYSTEM
Filed June 30, 1939
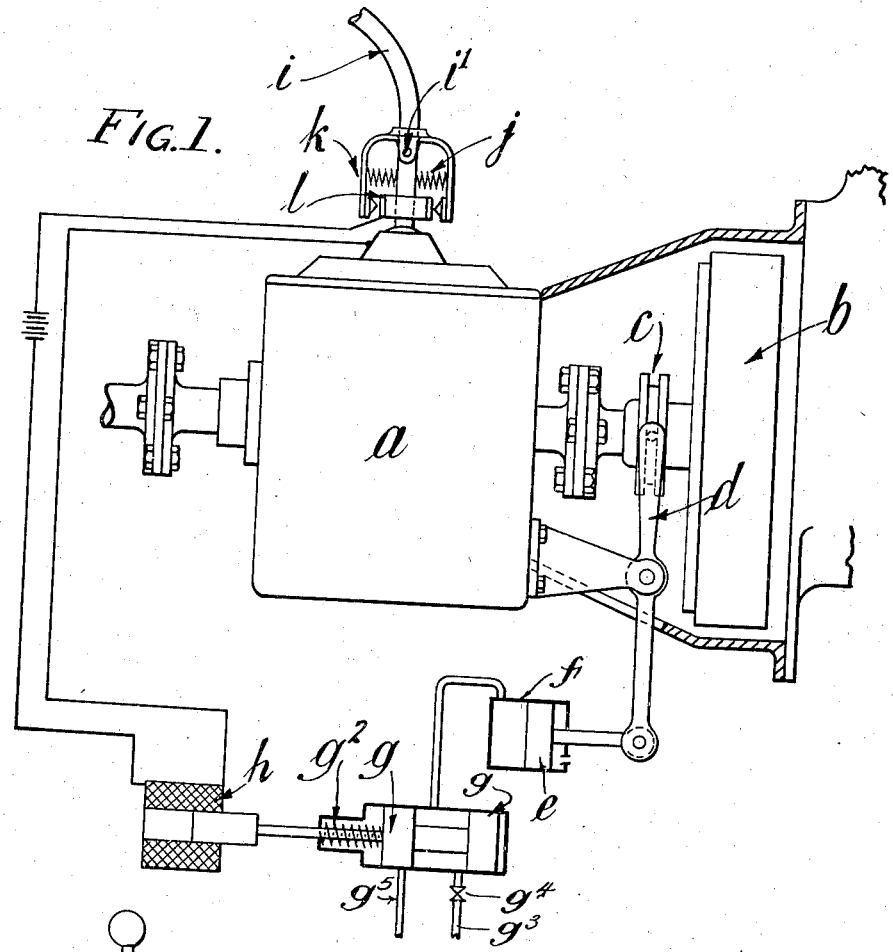
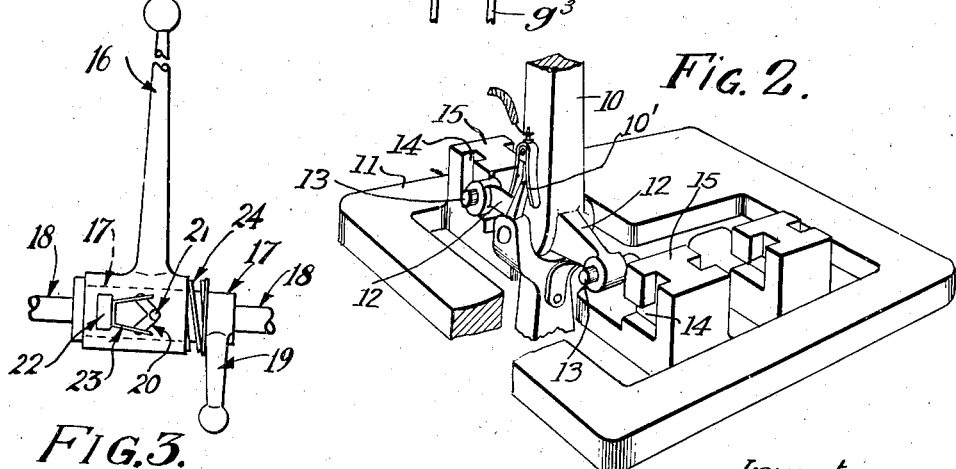
Inventor:
Noel B. Newton
By his Attorney: Walter Gunn Patented Nov. 18, 1941

2,263,047

UNITED STATES PATENT OFFICE 2,263,047

POWER TRANSMISSION SYSTEM

Noel Banner Newton, Acton, London, England

Application June 30, 1939, Serial No. 282,213
In Great Britain July 4, 1938

4 Claims. (Cl. 192—3.5)

This invention relates to power transmission systems of the kind comprising a change speed gear having toothed pinion wheels giving defined gear ratios and clutch mechanism, such as is used in a motor-propelled vehicle, and in which the operation of selecting any gear ratio, or change of gear ratio, is separate from that of declutching.

There are several different types of clutch and several different types of gear box which are employed in combination for transmission systems of the said kind. Of the clutches there are the ordinary clutch with or without power operation, the automatic centrifugal clutch with voluntary control, the automatic centrifugal clutch without voluntary control and the fluid flywheel also without voluntary control. Of the gear boxes there are the ordinary gear-box or the synchro-mesh gearbox both of which have only a selector control, or the epicyclic gearbox which has both a selector control and a control for the selected brake bands of the gearbox, separate from the selector control or combined therewith as in the case of an epicyclic gearbox with electro-magnetic clutches or where such brake band control is otherwise power-operated.

For obvious reasons, as is well known, if the clutch has no voluntary control, it can only be coupled with an epicyclic or like friction controlled gear, the control for the brake bands or like elements of which takes the place of the clutch control during gear changing, such brake band control being similarly pedal operated where separate control is required.

In a motor vehicle, however, there are the accelerator and the brake, both of which are pedal controlled so that with any of the aforesaid combinations there have been provided 3 control pedals, where separate clutch control is required.

The object of the present invention is to simplify gear changing and in many cases to enable the pedal controls to be limited to the two for the accelerator and brake, to the exclusion of a clutch or brake band pedal, whilst at the same time providing, without introducing an additional lever or other member for manual operation, the independent control for the clutch or gear brake band which, to the majority of drivers, is essential for a sense of full control of the vehicle.

According to the invention, control mechanism for power transmission systems embodying a change speed gear with selector mechanism and drive take-up mechanism, comprises a single control lever, means coupling the lever to the drive take-up mechanism and further means coupling the lever to the gear selector mechanism and means whereby disengagement of the drive take-up mechanism is obtainable separate from, or so as unavoidably to precede gear change.

The expression "gear change" is used herein to mean change from one gear ratio to another or to or from one gear ratio to neutral, and moreover, it refers to movement of the actual gear selector mechanism and not of any pre-selector mechanism which may be incorporated in the system.

It has been proposed to provide a button or secondary lever on the gear lever to operate an electric switch or valve whereby electric, pneumatic or hydraulic power may be caused to operate the clutch withdrawal mechanism. Although such button or secondary lever is on the main lever and moves therewith, it and the lever do not form a single manual control within the meaning of this invention, as it is only connected to the clutch withdrawal mechanism, whilst the lever is only connected to the gear selector. Also, although separate control of such two mechanisms is thereby provided it is not impossible for them to be operated in the wrong sequence.

In the accompanying drawing:

Fig. 1 is a diagrammatic illustration of one example of the invention.

Fig. 2 shows a modified construction of articulated gear lever according to this invention.

Fig. 3 shows a modification of the invention as applied to the selector lever of a synchromesh gearbox.

In one example of the invention, as shown in Fig. 1, a synchro-mesh variable speed gear $a$ is combined with an automatic centrifugal clutch $b$ having voluntary withdrawal mechanism comprising a grooved ring $c$ and forked lever $d$. Instead of coupling the lever $d$ of such withdrawal mechanism to a clutch pedal it is connected to the piston $e$ of a vacuum motor $f$ for operation by the engine vacuum and having a control valve, the piston $g$ of which is adapted for operation by an electric solenoid $h$. The gear selector hand lever $i$ is articulated at the pivot $i^1$ in the direction of movement for effecting gear engagement or disengagement and has centralizing springs $j$ so that the articulated point assumes a normal central position. On the handle end of the lever $i$ are arms $k$ adapted to make contact with a ring $l$ carried on an insulating bush on the lower part of the lever. The normal resistance to movement of the dogs or sliding selector mechanism of the gear, assisted if necessary by detents, will, therefore, cause the lever to bend at its articulated joint before movement can be effected. The electric switch mechanism consisting of the arms $k$ and contact ring $l$, provided on the lever adjacent to such joint, operates so that the articulating movement of the lever in either direction completes an electric circuit shown diagrammatically in Fig. 1 to energise the solenoid and effect clutch withdrawal. As can be seen on the diagram, when the piston $g$ is in the normal position shown under the action of its return spring $g^2$, the atmosphere is admitted by the pipe $g^3$ through valve $g^4$ to the cylinder $f$, whereas, when the solenoid is energised to pull the piston to the left, the atmosphere pipe $g^3$ is closed by the piston $g$ and the pipe $g^5$ is uncovered whereby the vacuum system is connected to the cylinder $f$, causing the clutch to be disengaged. As soon as the manual pressure on the lever is released the electric circuit is broken and the clutch re-engages smoothly under the control of the vacuum cylinder which prevents too sudden re-engagement.

Thus, it will be seen, the gear lever cannot move the dogs or other selector mechanism of the gear either for engagement or disengagement, without articulating movement of its parts and thereby first effecting clutch withdrawal. Furthermore, where an automatic centrifugally controlled clutch is provided, the gear lever may be released after engaging a gear and when the engine is only idling.

If there is provided an additional detent for the neutral gear position, and the centralising spring is made sufficiently strong, and the articulating movement of the lever is of limited amplitude, an automatic double-declutching action may be obtained from a simple straight through movement of the lever as may easily be appreciated, by the gear selector snapping into neutral, momentarily permitting the lever to straighten and causing re-engagement of the clutch followed by the holding of the selector in neutral whilst the clutch is again disengaged preparatory to further movement of the selector.

In a modification of the above construction, as shown in Fig. 2, the gear lever 10 could be articulated close to the usual gate 11 and have cranked arms 12, each with a projecting stud 13 engaging a cam slot 14 in upstanding webs 15 on the gate so that there are predetermined positions in neutral or in full engagement for any one gear ratio, where alone it is possible for the parts of the lever to have relative movement at the joint into or out of the clutch-engagement position, the stud preventing movement of the lower part of the lever until so moved and similarly preventing straightening of the lever again except in one of such positions. The lever 10 is provided with a contact switch 10' adjacent to its articulation pivot.

As shown in Fig. 3 the gear selector lever is in two parts 16 and 19, the part 16 being journaled on a sleeve 17 slidably and rotatably mounted on the shaft 18. The sleeve 17 carries the part 19 which operates the gear selectors. In the hub of the lever 16 is a V-shaped slot 20 which is engaged by a pin 21 fixed in the sleeve 17. On the hub is also a block 22 of insulating material carrying a U-shaped contact member 23 adapted to be engaged by the pin 21. On the sleeve 17 is a spring 24 which acts to return the lever to a centralized position as shown. In this example there is axial movement during articulation movement of the lever on the sleeve, which could be employed to operate switch mechanism. The above described lever mechanism could be used in the arrangement shown in Fig. 1 in place of the articulated lever therein shown, the wiring being taken to the contact member 23 and an earth return employed, as can easily be appreciated.

It would perhaps be possible to arrange the lever so as to operate the clutch by direct mechanical means, but the energy required to overcome the clutch spring is such that unless pedal operated, some relay or power-operated mechanism is the most practical solution.

Obviously, instead of operating the mechanism by electric contacts on the articulated lever, the lever could easily be constructed to incorporate a valve or valves at or adjacent to the joint so that flexing of the lever opens or closes the valve or valves to actuate the mechanism. Electric switch mechanism is however preferred as being simple and reliable.

What I claim is:

1. A combined gear changing and clutch-operating mechanism for a power transmission system, comprising a two-part articulated operating lever, spring means co-acting between the parts to determine a normal medial relationship between the articulated parts, complementary electric contacts on the two parts adapted for mutual engagement with relative movement of the parts in either direction, and electrically-operated clutch withdrawal mechanism in circuit with said contacts so that initial relative displacement of the articulated parts in either direction effects automatic clutch withdrawal.

2. A combined gear changing and clutch-operating mechanism for a power transmission system, comprising a two-part articulated operating lever, spring means carried on the lever determining a normal medial relationship between the articulated parts, two sets of co-operating electric contacts carried by the said articulated parts, with one set on each side of the medial position of the parts and one contact of each set on each part; and electrically-operated clutch withdrawal means in circuit with both said sets of contacts, so that initial relative displacement of the articulated parts in either direction effects automatic clutch withdrawal.

3. A combined gear changing and clutch-operating mechanism for a power transmission system, comprising a two-part articulated operating lever arranged for its articulating movement in the same direction as the lever's bodily gear-changing movement, spring means carried on the lever determining a normal medial relationship between the articulated parts, two sets of co-operating electric contacts carried by the said articulated parts, with one set of each side of the medial position of the parts and one contact of each set on each part; and electrically-operated clutch withdrawal means in circuit with both said sets of contacts, so that initial operating pressure on the lever in either direction effects movement to engage the contacts and effect automatic clutch withdrawal, and further pressure in the same direction effects a gear change.

4. A combined gear-changing and clutch-operating mechanism for a power transmission system, comprising a two-part articulated operating lever arranged for its articulating movement in the same direction as the lever's bodily gear-changing movement, spring means co-acting between the parts to determine a normal medial relationship between the articulated parts, complementary electric contacts on the two parts adapted for mutual engagement with relative movement of the parts in either direction and electrically operated clutch withdrawal mechanism in circuit with said contacts so that initial operating pressure on the lever in either direction effects movement to engage the contacts and effect automatic clutch withdrawal, and further pressure in the same direction effects a gear change.

NOEL BANNER NEWTON.